(12) United States Patent
Kasik et al.

(10) Patent No.: US 8,280,980 B2
(45) Date of Patent: Oct. 2, 2012

(54) METHODS AND SYSTEMS FOR PROVIDING A SYNCHRONOUS DISPLAY TO A PLURALITY OF REMOTE USERS

(75) Inventors: David J. Kasik, Sammamish, WA (US); Tyson D. Runnels, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 717 days.

(21) Appl. No.: 11/549,886

(22) Filed: Oct. 16, 2006

(65) Prior Publication Data
US 2008/0091772 A1 Apr. 17, 2008

(51) Int. Cl.
*G06F 15/16* (2006.01)
(52) U.S. Cl. ........ 709/218; 709/203; 709/248; 709/200; 715/740; 345/419
(58) Field of Classification Search .................. 709/247, 709/248, 200, 203, 218, 224; 715/733, 740; 345/419
See application file for complete search history.

(56) References Cited

U.S. PATENT DOCUMENTS

| | | | | |
|---|---|---|---|---|
| 6,397,230 | B1 * | 5/2002 | Carmel et al. | 715/210 |
| 7,321,367 | B2 * | 1/2008 | Isakovic et al. | 345/502 |
| 2001/0056550 | A1 * | 12/2001 | Lee | 713/201 |
| 2002/0080143 | A1 * | 6/2002 | Morgan et al. | 345/581 |
| 2003/0160792 | A1 * | 8/2003 | Alcorn | 345/502 |
| 2004/0062250 | A1 * | 4/2004 | Pickering et al. | 370/395.21 |
| 2005/0081161 | A1 * | 4/2005 | MacInnes et al. | 715/765 |
| 2006/0282855 | A1 * | 12/2006 | Margulis | 725/43 |
| 2007/0086134 | A1 * | 4/2007 | Zweigle et al. | 361/85 |

OTHER PUBLICATIONS

Okzy, retrieved on Oct. 16, 2006 at <<http://web.archive.org/web/20041016124047/www.okyz.com/index.cgi>>, archived on Sep. 24, 2004, 2 pages.
<<www.ati.com >> retrieved on Oct. 16, 2006, 1 page.
<<www.lattice3d.com>> retrieved on Oct. 16, 2006, Lattice Technology, Inc., 2 pages.
Reality Wave, retrieved on Oct. 16, 2006 at <<http://web.archive.org/web/20050209065001/www.realitywave.com/>> archived on Feb. 13, 2006, Reality Wave, Inc., 2 pages.
<<www.righthemisphere.com>> retrieved on Oct. 16, 2006, 1 page.

\* cited by examiner

*Primary Examiner* — Ario Etienne
*Assistant Examiner* — El Hadji Sall

(57) ABSTRACT

Methods and systems for providing a synchronous display to a plurality of remote users are disclosed. In one embodiment, a method includes providing a synchronous display from a host to a plurality of remote users comprising rendering a frame on the host, determining a communication characteristic between each of the plurality of remote users and the host, modifying a frame display characteristic for at least one of the plurality of remote users based on one or more of the communication characteristics, and transmitting the frame to two or more of the plurality of remote users to provide substantially synchronous display of the frame to the two or more of the plurality of remote users, wherein transmitting includes transmitting to the at least one of the plurality of remote users based on the modified frame display characteristic.

12 Claims, 4 Drawing Sheets

METHODS AND SYSTEMS FOR PROVIDING A SYNCHRONOUS DISPLAY TO A PLURALITY OF REMOTE USERS

FIELD OF THE INVENTION

The present invention relates to methods and systems for providing computer information to remote users, and more specifically to providing synchronous display of 3D computer renderings to remote users.

BACKGROUND OF THE INVENTION

In modern distributed enterprises, designers in multiple remote locations must review designs during meetings. A number of remote participants often want to visually inspect detailed product designs using digital geometry on a computer. During such meetings, a participant may want to inspect a design for various characteristics, such as detailed part space reservation, interference, excessive gaps, maintainability, manufacturability, alternative configuration comparison, detailed part data, and executive and customer approval. These visual inspections occur with participants in a single meeting space, or in various locations distributed around the globe simultaneously using tools such as Internet connections and teleconferencing.

A design review typically starts by loading a set of 3D geometry models into computer memory. To allow a person to visualize the 3D geometry models, the computer processes the models with rendering algorithms that employ standard CPUs and/or graphics accelerators to produce an image, or frame, on a computer-display screen. The algorithms render the 3D model in a realistic-looking 2D picture that is understandable to many users. To achieve a sense of the 3D nature of the set of models, users are allowed to scale, rotate, and translate the image in real time (around 15 frames per second). What each user sees on his or her screen is limited by the speed of the computer and, for remote users, the network bandwidth. It is highly beneficial for design review continuity to have all participants see the same image at the same time, including dynamic transformation operations in order to conduct real time collaboration.

One method to conduct a simultaneous design review requires distributing copies of data, often gigabytes in quantity, to all remote locations in order to accommodate simultaneous display performance. However, such distribution may not be desirable because of security risks, large storage requirements for remote users, and preparation time. Further, this method is disadvantageous when a disparity in rendering performance on remote user's computers is present. Thus, it is desirable to centrally locate the source data. Another method of conducting simultaneous review involves rendering in a central location and sending only the rendered frame to each user. However, when distances increase and traffic is routed on the general Internet, individual frames are transmitted at unpredictable rates, primarily due to unpredictable variances in network bandwidth for each user. This causes user frustration because of inconsistent rendering speeds and poor interactivity with other users. Another possible method involves reducing the level of detail of the centrally-rendered frames when they are transmitted to remote users. This action may increase image-manipulation and load-time performance but it reduces the effectiveness of the presentation and requires more software complexity. Further, it penalizes users with a greater network bandwidth, as they are only sent the amount of information as the lowest network bandwidth user can process, thus overcompensating the frame resolution reduction for all users except the user with the smallest network bandwidth.

Therefore, it would be advantageous to provide a synchronous display of 3D computer renderings to remote users where the computer rendering is conducted in a central location and where each remote user is able to see as much detail of the centrally-transmitted rendered frames as his or her network bandwidth will permit.

SUMMARY OF THE INVENTION

The present invention relates to methods and systems for providing a synchronous display to a plurality of remote users. In one embodiment, a method includes providing a synchronous display from a host to a plurality of remote users comprising rendering a frame on the host, determining a communication characteristic between each of the plurality of remote users and the host, modifying a frame display characteristic for at least one of the plurality of remote users based on one or more of the communication characteristics, and transmitting the frame to two or more of the plurality of remote users to provide substantially synchronous display of the frame to the two or more of the plurality of remote users, wherein transmitting includes transmitting to the at least one of the plurality of remote users based on the modified frame display characteristic.

In another embodiment of the present invention, a computer-based system includes providing a synchronous display from a host to a plurality of remote users comprising a first component configured to render a frame on the host, a measurement of a communication characteristic between each of the plurality of users and the host, a modification of a frame display characteristic for at least one of the plurality of remote users based on the one or more of the communication characteristics, and a second component configured to transmit the frame to two or more of the plurality of remote users, wherein transmitting includes transmitting to the at least one of the plurality of remote users based on the modified frame display characteristic.

BRIEF DESCRIPTION OF THE DRAWINGS

Embodiments of the present invention are described in detail below with reference to the following drawings.

DETAILED DESCRIPTION

The present invention relates to methods and systems for providing a synchronous display, such as a display of computer renderings of 3D models, to a plurality of remote users. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
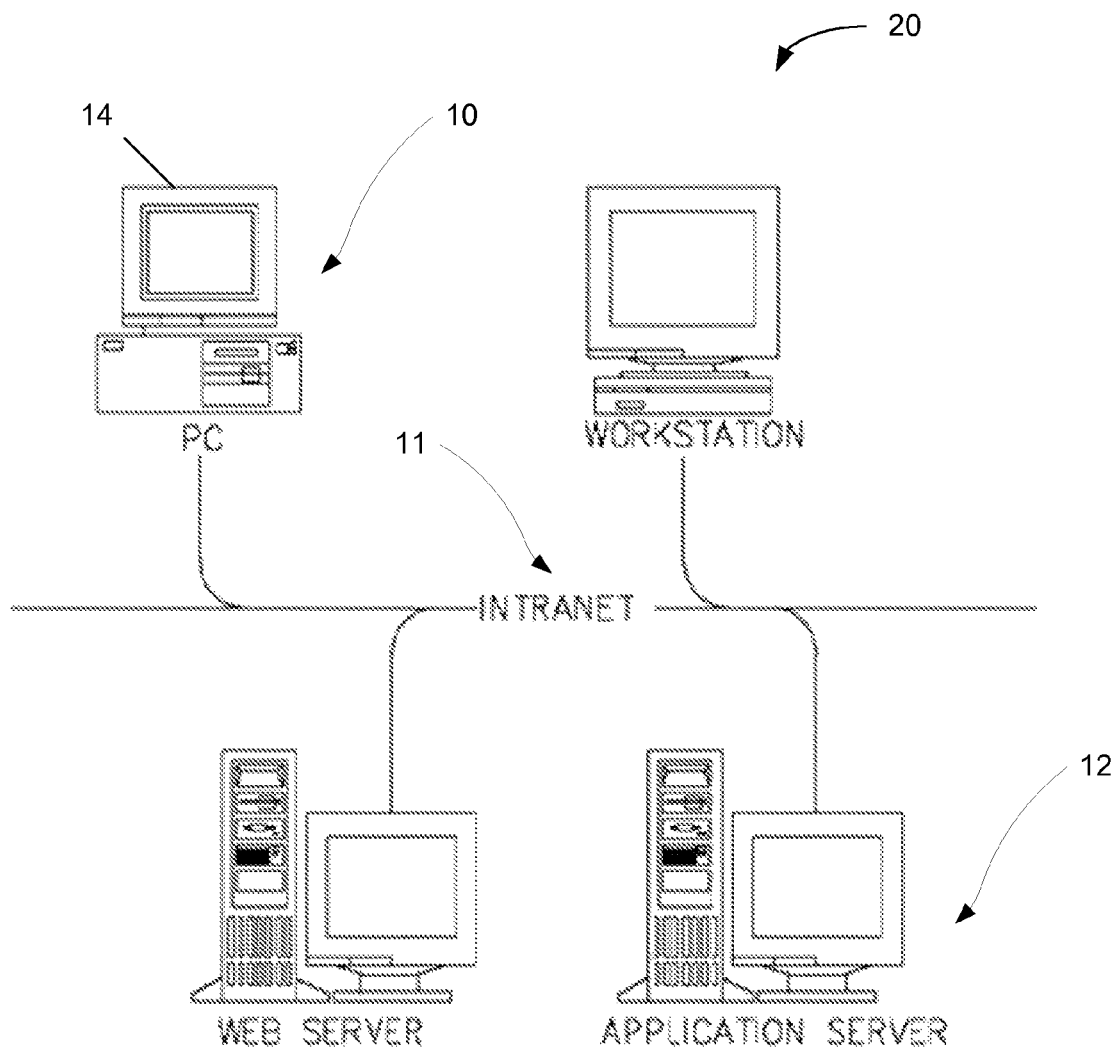
FIG. 1 is a schematic of a system architecture for providing a synchronous display to a plurality of remote users in accordance with an embodiment of the present invention.

In a system architecture 20 consistent with an embodiment of the present invention, as depicted in FIG. 1, a user utilizes a data processing system 10, such as a personal computer (PC), and may use a communication network 11 (e.g. an Internet or intranet connection) in order to launch a program from a server 12. A display 14 is used to provide the user with a choice of inputs to prepare a model (not shown). The program runs in memory on the server 12 or in a distributed system, which allows end-users and system designers and analysts to interact with the model to rapidly design, modify, and/or test and validate the model.

For example, in a client-server arrangement, a client computer system and server computer system would each be connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network. The present invention may also be implemented in such a distributed system environment.

Further, although aspects of one implementation are depicted as being stored in memory, it will be appreciated that all or part of the systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Further, it will be appreciated that generic embedded technology architecture suitable for use with methods, systems, and articles of manufacture consistent with the present invention may contain additional or different components.

Figure 2:
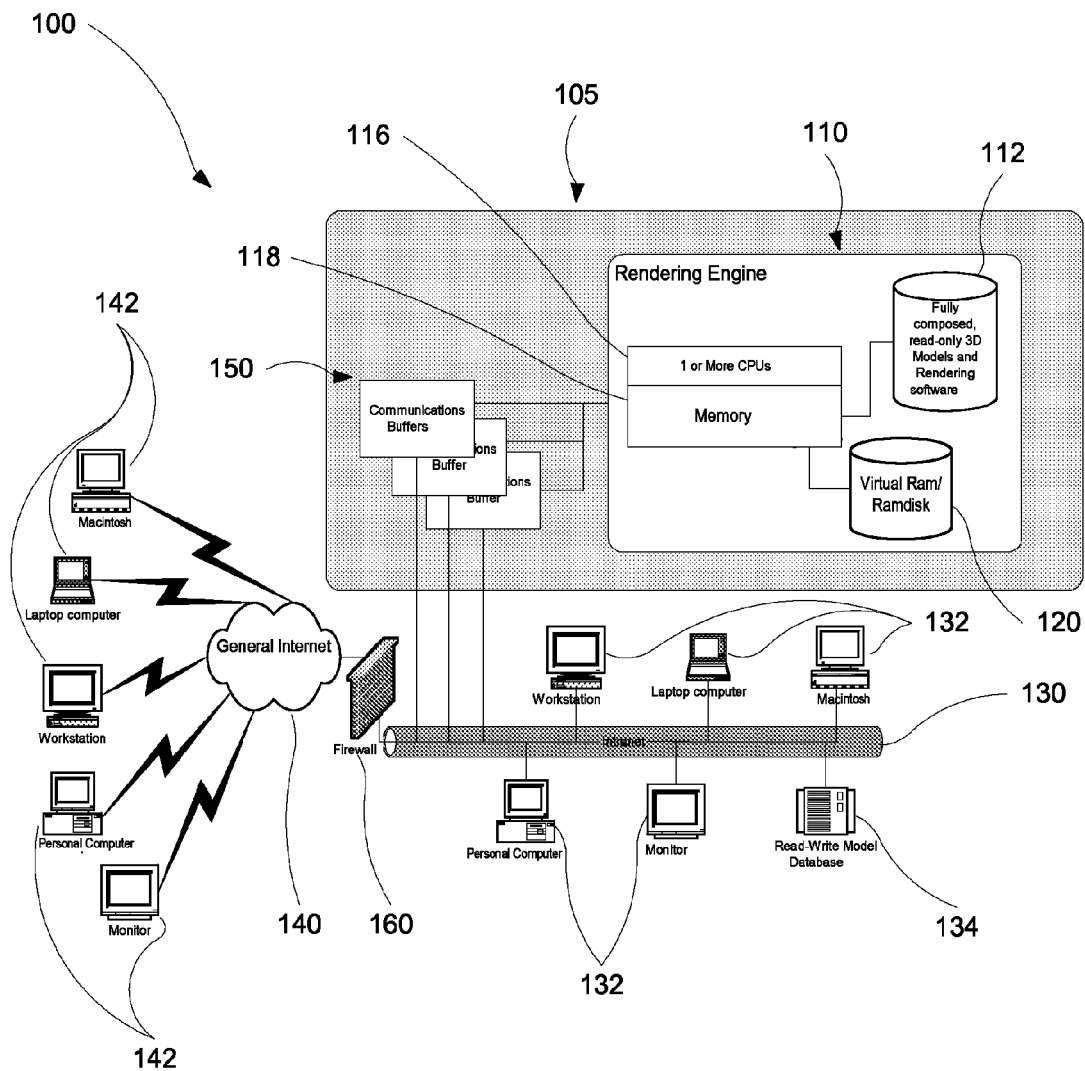
FIG. 2 is a schematic of a system architecture for providing a synchronous display to a plurality of remote users in accordance with an alternate embodiment of the present invention.

FIG. 2 shows another system architecture 100 for providing a synchronous display (e.g. a display of computer renderings of 3D models) to a plurality of remote users in accordance with one embodiment of the invention. The system 100 includes, in this embodiment, a multi-user visualization warehouse 105 that includes a rendering engine 110, communication buffers 150, and connectivity to an intranet 130. A plurality of computers 132 are operatively coupled to the intranet 130. The intranet 130 is further coupled to the Internet 140 via a firewall 160. A plurality of computers 142 are coupled to the Internet 140. Computers 132, 142 may be laptop computers, workstations, personal computers (PCs), Macintosh computers, hand-held devices, or the like, each having a display device interactive with the computer 132, 142 where a user can visually receive and review updated images, or frames, received by the computer 132, 142.

The rendering engine 110 includes a rendering software application able to read one or more models 112. The models 112 may be three-dimensional (3D) models, and may be stored on a read-write model database 134 in network connectivity with the rendering engine 110 through the intranet 130. The rendering software application may be computer-aided design (CAD) software, such as PRO/Engineer, AutoCAD, or the like. Alternatively, the rendering software may be CAD viewing software, such as Boeing FlyThru, Boeing Integration Visualization Tool, Lattice3D, RealityWave, OpenRT, or any other suitable rendering software, allowing a user to manipulate an image, including a 3D image, in a read-only environment. Further, the rendering engine 110 may include one or more CPUs 116, memory 118, and virtual memory 120. In an alternative embodiment, the rendering engine 110 is a server workstation where a 3D model 112 is stored on the server hard-disk.

The rendering engine 110 is communicatively connected to one or more of the communication buffers 150. The communication buffers 150 receive digital information from the rendering engine 110. As shown in FIG. 2, the communications buffers 150 may be coupled to the intranet network 130, or in alternate embodiments, may be coupled directly to the Internet 140. The intranet 130 may be protected by the firewall 160 to prevent security breaches from unauthorized external computer users.

Figure 3:
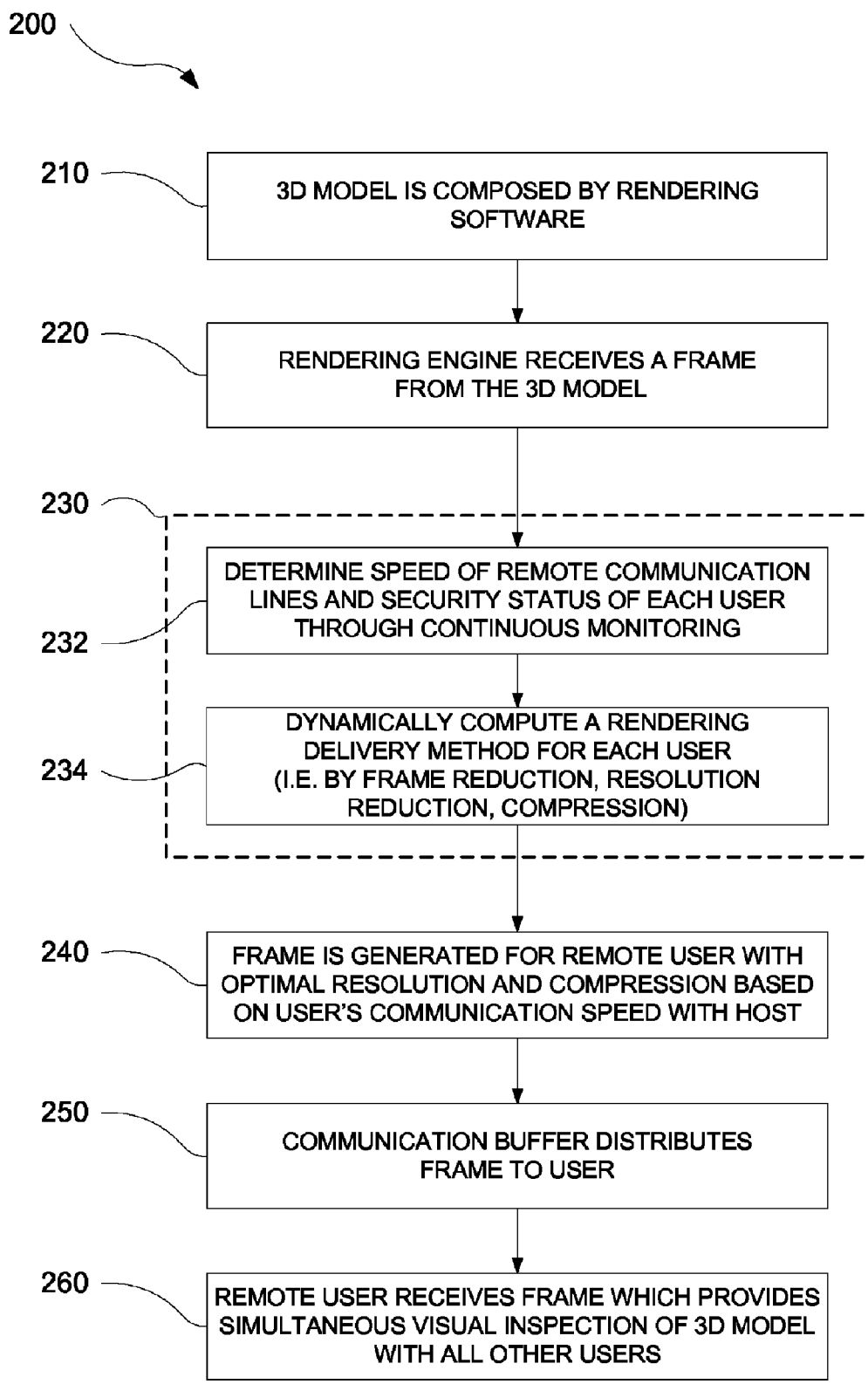
FIG. 3 is a flow chart of a method of providing synchronous display of computer renderings to remote users consistent in accordance with another embodiment of the present invention.

FIG. 3 shows an overall process flow (or method) 200 for providing synchronous display of computer renderings to a plurality of remote users in accordance with another embodiment of the present invention. At a block 210, a model (e.g. a 3D, 2D, or other model) is composed by the rendering software of the rendering engine 110. The model may be as complex as a commercial airplane assembly, including many parts composed in a digital 3D model environment. The rendering software may be of any suitable type, including a variety of commercially available rendering software applications able to read and display model information. In one embodiment, the rendering software is able to manipulate the model, such as by scaling, translating, rotating, and graphically selecting the model by the control of a local user. Further, the rendering performed at block 210 may include selecting, retrieving, and loading a model, including computing algorithms to produce a realistic-looking 2D image from a set of 3D model data stored on a computer readable medium. Embodiments of the present invention may advantageously include adequate computer software and computer hardware to generate a complete product model which can be examined in real time.

With continued reference to FIG. 3, at a block 220, a rendering engine receives a frame from the model generated at block 210. For example, after the model is composed by the rendering software in block 210, the model may be manipulated, such as being scaled, translated, rotated, or graphically selected by a controlling host user. During this manipulation, the rendering engine captures individual frames of the manipulation generation of the model at block 220. When these frames are displayed chronologically, they depict the manipulation of the model by the controlling host user.

Next, a block 230 includes dynamic determination of the communication line bandwidth between the host and one or more remote users. More specifically, the method 200 includes determining the bandwidth of remote communication line and security state of each user through continuous (or periodic) monitoring at a block 232. For example, the host computer may ping a remote computer and measure the time for the remote computer to respond, thus measuring the communication time and bandwidth of the remote user's network connection. Additionally, the host computer may monitor the security status of a remote user's computer and accordingly provide encryption of data to the user. An array of commercial software is available for implementation on a host computer for monitoring a network connection and measuring the network connection's bandwidth in connection to a remote user. Next, the method 200 dynamically computes a rendering delivery method for each user at a block 234. This may include reducing the resolution of the frame, such as eliminating pixels, modifying the compression of the data transmitted from the host computer to the remote user, or determining not to send the frame to a remote user.

In one embodiment of the present invention, the monitoring and measuring of the communication line between the host and the remote users in block 230 occurs every time a frame is generated by block 220. In an alternative embodiment, the monitoring and measuring of the communication line between the host and remote users may occur more or less frequently than the frame generation rate (block 220) by the rendering engine. For example, the communication line may be monitored and measured every 10 seconds, whereas frames may be generated in block 220 at a frequency of 15 Hertz (15 per second) in order to produce a real-time display to an end user when the model is manipulated. It is advantageous to continually monitor the bandwidth of the network connection between each remote user and the host because the bandwidth may fluctuate over short intervals of time.

At a block 240, the method 200 generates a frame for a remote user with optimal resolution rate and compression based on the user's communication bandwidth with the host. In one embodiment, the frame generated by block 220 will be reduced in data size, thus reducing the number of bits of computer data required to generate the frame on a remote computer, by reducing the resolution of the frame according to the communication bandwidth between the remote user and the host. For example, if the communication bandwidth for one particular remote user is relatively wide, the frame may not be reduced in size, or may only be reduced by a small percentage from the frame's original data size. However, if the communication bandwidth of a second remote user is relatively narrow, the frame's resolution may be considerably reduced in order to allow the second remote computer to process the frame, thus permitting the second user to see the frame with substantial synchronization with the first user and the host. In yet another embodiment, the frame generated by block 240 may be compressed to a greater degree for a user with a communication bandwidth that is narrower relative to another user. In still another embodiment, a combination of reducing the resolution of a frame and compressing the frame for subsequent decompression by a remote user's computer will permit the host and remote users to have substantial synchronization of frames.

As further shown in FIG. 3, at a block 250, one or more of the communication buffers distributes the frame to the remote user. Therefore, after the frame is modified by block 240, the frame is delivered to remote users such that the delivery of the frame is substantially synchronized for receipt and viewing of the delivered frame.

In an alternative embodiment, the block 250 may not send the frame to a particular user. For example, for a relatively narrow communication bandwidth between the host and a particular remote user, the communication buffer may elect not send a frame to the particular remote user, but rather, may elect to skip the particular user for that particular frame. In the situation where 15 frames are produced by the host computer every second, creating real-time viewing of a 3D model, an end user with a relatively narrow communication line bandwidth may only receive a small percentage of these 15 frames in order to permit the particular remote user to receive and view the frames in substantial synchronization with the host and other remote users.

In some embodiments, methods and systems in accordance with the present invention are configured to ensure that the frame display rate to a plurality of remote users is substantially synchronized (although not absolutely synchronized) such that a frame is displayed approximately simultaneously to all remote users within an approximate one second time period. In further embodiments, systems and methods in accordance with the invention may be configured to ensure that frames are updated to all remote users at a rate greater than or equal to a level of human flicker fusion threshold (e.g. approximately 15 Hz).

In block 260, each of the plurality of remote users receives the frame which provides approximately simultaneous visual inspection of the model with all other users, and the host. As best explained by an example, a 3D airplane computer model may be orientated at zero degrees relative to a reference line at time zero. In an exercise manipulation, the host user will rotate the 3D airplane computer model to a position of 30 degrees relative to the reference line with constant rotation, reaching the 30 degrees position in 2 seconds, where frames are generated in block 220 at fifteen times per second (i.e. each of the 30 frames generated will depict 1 degree of rotation relative to the prior frame). Therefore, at the initiation of the manipulation by the host at time zero, each user and the host receive the frame depicting the airplane computer model at the zero degrees position. At substantially one second, each user and the host receive a frame depicting the airplane computer model at a 15 degree position, however, some users may not see the frame with the same level of resolution, and additionally, some users may not have the frame delivered because that particular user's communication bandwidth is relatively narrow (as further explained below). At the two second time mark, each remote user will see the airplane computer model reach the 30 degree position relative to the reference point.

To further illustrate the example above, at least one frame in the sequence of the 30 frames described above may not be delivered to a first user with a communication bandwidth that is relatively narrow. For instance, a first subset of frames (e.g. frames 1, 3, 5, 7, 9, 11, 14, 17, 20, 22, 25, 27, and 29) may be sent to the first remote user in substantial synchronization with the host and the other remote users, while the intermediate frames are not sent to the first user. Similarly, a second remote user may receive a second subset of frames rendered by the rendering software (block 210), and a third remote user may receive a third subset of frames. In one embodiment, when frame 15 is viewed by the host, the first user will view frame 14. Similarly, when frame 16 is viewed by the host, the first user will still see frame 14. However, when frame 17 is delivered, the host and the first user will see frame 17 with substantial synchronization. This permits the remote user with the narrow communication line bandwidth to still observe the sequence of frames, thus providing real-time communication of a visual manipulation of a model to the first remote user, while generating frames on the first user's computer with narrow communication line with substantial synchronization with the host and other remote users. If the last frame, frame 30 in this example, is not delivered to a remote user because of a narrow communication bandwidth, but the model is no longer manipulated, the particular user with the narrow communication line will receive a frame of the final position as soon as the communication buffer (block 250) determines the remote user can receive the frame through the network connection. Thus, all users will see a substantially simultaneously presented sequence of frames, however some remote users may see frames with lower resolution than the host, while other remote users may not receive every frame in the sequence in order to maintain substantial synchronization.

In yet another embodiment of the present invention, the dynamic determination of the communication line bandwidth between the host and remote users (block 230) may determine a frame is not delivered to a user, while maintaining a consistent sequence of frames to the user such that the user is able to receive visually communication of the manipulation of a model in a real-time environment, and further while maintaining substantial synchronization with the host and other remote users. This determination may ensure that remote users with a relatively narrow communication bandwidth will view as many intermediate frames as physically possible during the manipulation, while delivering the number and sequence of frames necessary to facilitate a smooth real-time viewing of the delivered frames.

Figure 4:
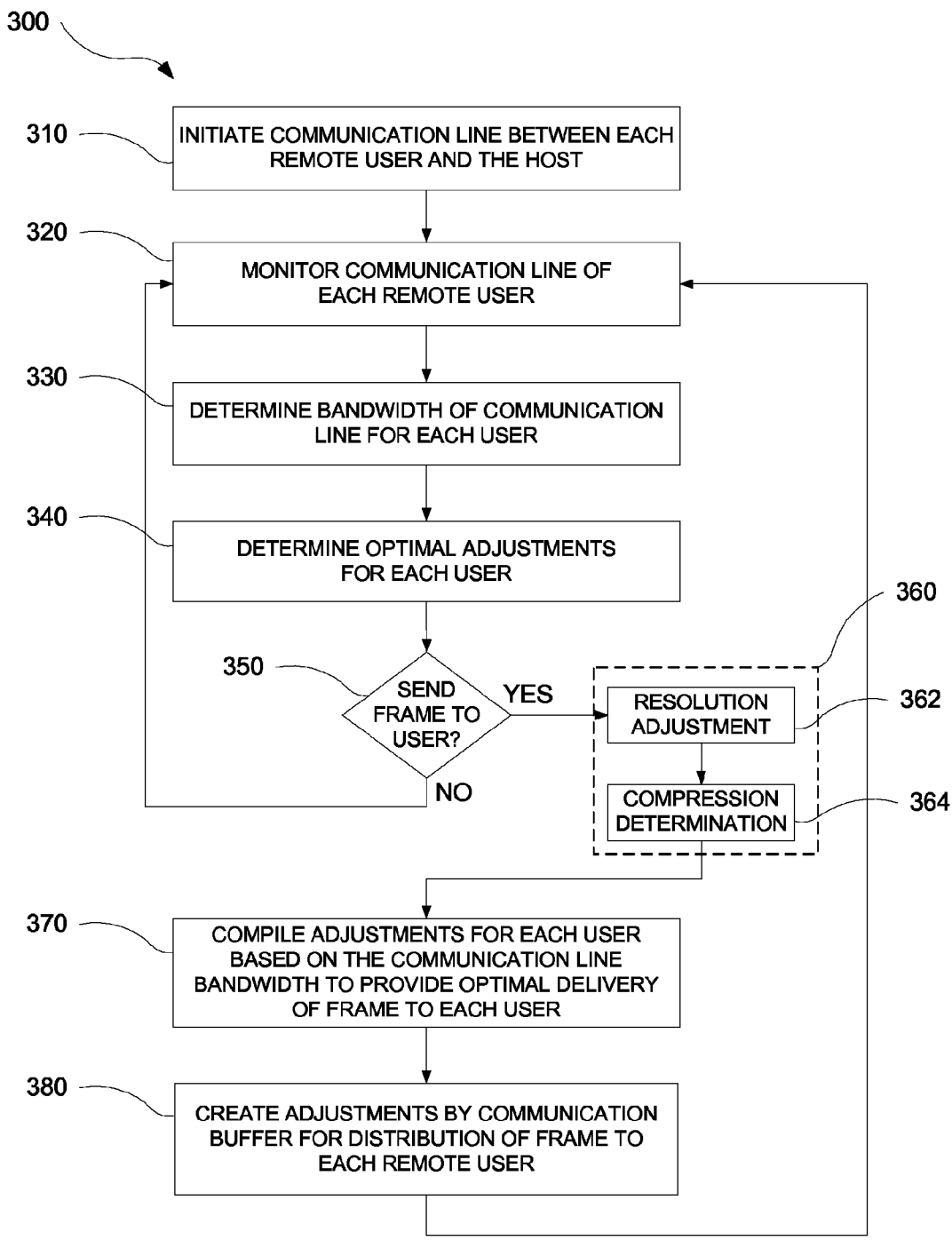
FIG. 4 is a flow chart of a method of providing a communication buffer to provide a synchronous display of computer renderings to a plurality of remote users in accordance with yet another embodiment of the present invention.

FIG. 4 shows a process flow for providing a communication buffer 300 to provide a synchronous display of computer renderings to remote users in accordance with another embodiment of the invention. In block 310, communication is initiated between each remote user and the host. For example, when a review meeting takes place to review a 3D rendering of an airplane computer model, multiple remote users log on to the Internet and make a network connection with the host computer. Additionally, a security code may be necessary to initiate communication between each remote user and the host. Also, the users may see a complete 3D model at initiation of a design review and can start working immediately rather than wait to load a model on the remote user's computer.

Next, as show in block 320, the communication line of each remote user is dynamically monitored. In one embodiment of the present invention, commercially available software, such as that available from Citrix Systems, Inc. of Fort Lauderdale, Fla., or the like, is integrated in a communication buffer (or other portion of the system 100) which is able to monitor the communication line of each remote user to determine the capacity of the each remote user's network bandwidth, computer central processing unit (CPU) speed, computer graphics-card processing speed, and other processing metrics that impact computer graphics rendering at a remote location when an image is sent through a network connection by a host computer. Alternatively, customized software may be implemented to monitor the communication line of each remote user in connection to the host by a network connection. In block 330, the bandwidth of the communication line for each user is determined. In one embodiment, the bandwidth may be measured by the aforementioned commercially available software integrated in the communication buffer. Alternatively, customized software may be implemented to measure the bandwidth of the communication line.

In block 340, communication adjustments for each user are determined in order to achieve substantial synchronous display of the model to remote users and the host. In some embodiments, the communications adjustments are determined by the one or more communication buffers 150 (FIG. 2), however, in alternate embodiments, the adjustments may be determined by other portions of the multi-user visualization warehouse 105, any by other suitable portions of the system 100 (e.g. such as in a distributed networking system). For example, in a particular embodiment, a communication buffer may reduce the resolution of a frame, or initialize compression of a frame in order to reduce the receipt delay by a remote user connected to a host computer by a computer network. In another example, a remote user may have narrow bandwidth on their network connection with the host computer. In such a circumstance, a reduction in resolution of a frame will reduce the amount of computer data required to transmit through a network connection, resulting in a shorter delay of receipt by a remote user of the computer data, thus the frame. Additionally, by compressing a frame, the compressed frame will require less computer data to be transmitted to a remote user, shortening the delay in receipt by a remote user. Alternatively, the communication buffer (or other suitable portion of the system) in block 340 may determine that the frame should not be sent to a particular remote user in order to minimize the data transmission between the host and a particular remote user with limited network bandwidth.

At block 350, a decision whether to send the frame to a particular remote user is conducted. If the frame is not sent to that particular user, the monitoring of the communication line in block 320 repeats. However, if the communication buffer determines the frame should be sent to a particular remote user, the frame may undergo manipulation at a block 360 in order to decrease the frame's data size for faster delivery from the host to a remote computer through a network communication line. Further, the manipulation (block 360) may include either a resolution reduction or adjustment (block 362) or a compression (block 364) of the frame, or both, or any other suitable manipulation.

As further shown in FIG. 4, in block 370 of the communication buffer process flow, adjustments for each user may be created based on the communication line bandwidth to provide optimal delivery of the frame to each user, thus the information determined for each user in block 340 is implemented on each particular user's frame. In an alternative embodiment, a frame may not undergo any adjustments such as for a remote user with a relatively wide communication line bandwidth with the host. In bock 380, adjustments are created by the communication buffer for distribution of the frame to particular remote users. Upon completion of bock 380, the communication process repeats to block 320 and continues to cycle until the review meeting has concluded and the remote users are disconnected from the host by closing the communication lines between the host and the remote users.

In an alternative embodiment of the method 300 described in FIG. 4, the determination of the bandwidth of communication line for each user (block 320), and the determination of bandwidth of communication line (block 330), may not occur at the same frequency as other portions of the method 300 (blocks 350, 360, 370, and 380). For example, in one embodiment, the communication line would be monitored for every frame that is adjusted by the communication buffer. In an alternative embodiment, the communication line determinations (blocks 320, 330) would be preformed less frequently than the other portions of the method 300 (one or more of blocks 340, 350, 360, 370, 380) which manipulate the frame for delivery to each particular remote user. In still another embodiment, the communication line determinations (blocks 320, 330) would be preformed more frequently than the other portions of the method 300 (one or more of blocks 340, 350, 360, 370, 380) which manipulate the frame for delivery to each particular remote user.

One of ordinary skill in the art would appreciate that the above-described embodiments of the invention are merely possible examples of implementations which are set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

Thus, while preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method comprising using a host computer to provide a synchronous display to a plurality of remote users, the method including:
rendering a 3D model at a single location to produce frames of the rendered model;
continuously monitoring transmission bandwidth of each of the plurality of remote users; and
transmitting modified frames of the rendered model to each of the remote users so that all of the remote users display the rendered model synchronously; wherein a frame transmitted to a user is modified according to that user's monitored bandwidth, a frame modified by at least one of dropping the frame, compressing the frame and reducing resolution of the frame.

2. The method of claim 1, wherein the frames are modified in a communication buffer.

3. The method of claim 1, wherein the bandwidth is monitored each time a frame of the model is rendered.

4. The method of claim 1, wherein rendering a frame of the model includes rendering a frame of a 3D computer model after the model has been manipulated.

5. The method of claim 1, wherein bandwidth of a remote user is monitored by pinging the remote user and measuring response time.

6. The method of claim 1, wherein the displayed model is updated at a rate that exceeds a human flicker fusion threshold.

7. A computer-based system for providing a synchronous display to a plurality of remote users comprising:
means for rendering a 3D model at a central location to produce frames of the rendered model;
means for continuously monitoring transmission bandwidth of each of the plurality of the users;
means for modifying the frames of the rendered model; and
means for transmitting modified and unmodified frames to the remote users so all of the remote users display the rendered model synchronously; wherein a frame is modified by at least one of dropping it, compressing it, and reducing its resolution to the corresponding user's monitored bandwidth.

8. The method of claim 7, wherein bandwidth of a remote user is monitored by pinging the remote user and measuring response time.

9. The system of claim 7, wherein a frame of a 3D computer-aided design model is rendered after manipulating the model.

10. The system of claim 7, wherein the modifying means includes a communication buffer.

11. The system of claim 7, wherein the bandwidth is monitored after a previous frame was rendered.

12. An article comprising a non-transitory computer readable medium encoded with computer executable instructions that, when executed, cause a computer to provide a synchronous display to a plurality of remote users, including:
rendering a 3D model at a central location to produce frames of the rendered model;
continually monitoring transmission bandwidth of each of the remote users; and
transmitting modified frames of the rendered model to each of the remote users so the remote users display the rendered model synchronously; wherein a frame transmitted to a user is modified according to that user's monitored bandwidth, a frame modified by at least one of dropping the frame, compressing the frame and reducing resolution of the frame.

* * * * *